United States Patent
Shibata et al.

(10) Patent No.: US 6,502,833 B1
(45) Date of Patent: Jan. 7, 2003

(54) METAL C-SHAPED RING GASKET

(75) Inventors: Hideshi Shibata, Shizuoka (JP); Kanji Hanashima, Kanagawa (JP); Ichiro Kubo, Shizuoka (JP); Shuichiro Wada, Shizuoka (JP); Masahito Tanemoto, Shizuoka (JP)

(73) Assignee: Nichias Corporation, Tokyo (JP)

( * ) Notice: Subject to any disclaimer, the term of this patent is extended or adjusted under 35 U.S.C. 154(b) by 27 days.

(21) Appl. No.: 09/606,446

(22) Filed: Jun. 29, 2000

(30) Foreign Application Priority Data

Jun. 30, 1999 (JP) .......................... 11-185312

(51) Int. Cl.⁷ .................................. F16J 15/02
(52) U.S. Cl. .................. 277/647; 277/650; 277/939; 277/924
(58) Field of Search ................. 277/438, 530, 277/541, 626, 627, 647, 650, 924, 939; 148/325, 327

(56) References Cited

U.S. PATENT DOCUMENTS

| 2,126,505 A | * | 8/1938 | Risser |
| 3,046,026 A | * | 7/1962 | Burrows |
| 3,058,750 A | * | 10/1962 | Taylor |
| 3,325,892 A | * | 6/1967 | Delgodo |
| 5,022,663 A | * | 6/1991 | Fages et al. |
| 5,354,072 A | * | 10/1994 | Nicholson |
| 5,477,976 A | * | 12/1995 | Suzuki et al. ............... 216/109 |
| 5,797,604 A | * | 8/1998 | Inagaki et al. ............... 277/618 |
| 6,273,477 B1 | * | 8/2001 | Ohmi et al. ................ 285/328 |

FOREIGN PATENT DOCUMENTS

| JP | 4-210224 | * | 7/1992 |
| JP | 0613611 A | * | 10/1992 |
| JP | 11-125 699 | | 5/2000 |

* cited by examiner

Primary Examiner—Anthony Knight
Assistant Examiner—Alison K. Pickard
(74) Attorney, Agent, or Firm—Flynn, Thiel, Boutell & Tanis, P.C.

(57) ABSTRACT

A metal C-shaped ring gasket is constructed so that a satisfactory sealing property can be obtained even with a low clamping pressure. The metal C-shaped ring gasket is made of an austenite stainless steel and constructed so as to have a superficial roughness below 0.2 μm Ra and a superficial hardness below 230 Hv by electrolytic polishing.

3 Claims, 2 Drawing Sheets

METAL C-SHAPED RING GASKET

FIELD OF THE INVENTION

The present invention relates to an improvement of a metal C-shaped ring gasket used for preventing leak of fluid in an ultra-high vacuum apparatus mounted in a semiconductor fabricating device, a nuclear power generating plant, etc.

DESCRIPTION OF THE PRIOR ART

Heretofore various kinds of metal gaskets have been used in a semiconductor fabricating device, etc. in order to obtain a high gas-tightness.

Among them, a metal hollow O-ring gasket is fabricated generally by forming a metal pipe made of stainless steel, inconel, etc. in a ring shape by bending processing, etc. and then by welding the,two ends thereof to each other. By a metal hollow O-ring of this construction a good sealing property can be obtained owing to the fact that the metal ring is deformed by a strong clamping pressure.

However, since the metal hollow O-ring gasket is fabricated by welding the two ends of the metal pipe formed in a ring-shape by bending processing as described above, flashes produced at welding remain usually inside and outside of the pipe. Since the flashes outside of the pipe are treated to be eliminated by cutting, grinding etc., the thickness of the pipe more or less decreases. Therefore compressing strength at the welded portion can be different from that at the other part at clamping. In case where it is mounted for use where an ultra-high vacuum is required, leak can be produced at the welded portion, where the thickness is decreased.

There is another problem that bending processing and welding are difficult, in case where the diameter of the gasket is as extremely small as e.g. about 10 mm. In addition, it is inconvenient that bolts having a high strength, to which a high clamping pressure can be given, are required.

For this reason, metal C-shaped ring gaskets have been more and more widely utilized, each of which has no welded portion, because it is fabricated by folding and bending a metal plate so as to have an approximately C-shaped cross-section, therefore formation of even a gasket having a small diameter size being easy.

A metal C-ring gasket having a C-shaped cross-section is obtained by punching a metal plate having a predetermined thickness in a doughnut shape and forming a doughnut-shaped metal plate thus obtained so as to have an approximately C-shaped cross-section by press processing.

Metal C-shaped ring gaskets, on the surface of which soft metal such as nickel, etc. is deposited by plating or sputtering in order to improve fitness with respect to counter surfaces, are widely used. However, in the recent semiconductor industry, since it is feared thastoxic gas is produced by reactions between used gas and nickel, it is desired to use a single material of an austenite stainless steel such as SUS316L, vacuum double melting material, and vacuum triple melting material thereof (materials obtained by double or triple melting/refining in vacuum in order to reduce various sorts of chemical components, which can cause pollution), having a good corrosion resistance.

However, by using a metal C-shaped ring gasket made of SUS316L, etc. no satisfactory sealing property can be obtained with a low clamping pressure, because hardness thereof is increased due to strain hardening of the surface at forming the C-shape by folding and bending a metal plate or a metal tube, and if the clamping pressure is increased, there is an inconvenience that the C-shape is deformed, which damages resiliency.

Therefore gaskets, in which coil springs are inserted into formed metal C-shaped ring gaskets in order to increase resiliency, are used. However, in such gaskets, there are portions, where the coil springs are not brought into contact with the inner surface of the C-ring, and portions, where they are brought into contact therewith. Therefore resilient elasticity is not uniform and a high clamping pressure is required, which gives rise to a problem that measures should be taken to use bolts having a high strength or to increase the diameter of the bolts.

SUMMARY OF THE INVENTION

The present invention has been made in order to remove the problems of the prior art metal C-shaped ring gaskets as described above and a main object thereof is to provide a metal C-shaped ring gasket so constructed that a satisfactory sealing property can be obtained, even if it is used with a low clamping pressure.

In order to achieve the above object, the inventors of the present invention have studied further a metal C-shaped ring gasket capable of sealing even with a low clamping pressure. As the result, they have found that a good sealing property can be obtained by a gasket, which is so constructed that it has an approximately crescent-shaped cross section by decreasing the thickness t1 of portions of the metal C-shaped ring gasket G2, which are brought into contact with counter surfaces and increasing the thickness t2 of the middle portion thereof and that hardness of the surface is decreased below 300 Hv by annealing it in a no oxygen atmosphere (Japanese Patent Application No. Hei 11-125699).

However it has been also found that impurities can be attached at annealing processing and extremely small scratches are formed at succeeding handling, which can give rise to leak, and that it is necessary to finish the surface by grinding it again after the annealing. At this time, if the gasket is ground mechanically e.g. by Barrel grinding, this gives rise to a problem that fitness with respect to the counter surfaces is worsened, which causes leak, because strain hardening is produced again and hardness of the surface is increased. As a result of their further ardent study it has been found that the sealing property is improved by lowering the hardness of the surface of the gasket below 230 Hv and maintaining roughness of the surface below 0.2 $\mu$m Ra by electrolytical polishing the surface of the metal gasket subjected to Barrel grinding in order to remove the hardened surface produced by mechanical grinding without any shock.

Further it is known that no preferable values of the roughness and the hardness of the surface can be obtained, unless amount removed by the electrolytical polishing is over 10 $\mu$m.

In addition, since the electrolytical polishing can remove also fine dust attached by the mechanical grinding, it is possible to obtain a clean gasket.

The present invention is a metal C-shaped ring gasket characterized in that it is made of an austenite stainless steel and that superficial roughness is kept below 0.2 $\mu$m Ra and superficial hardness is kept below 230 Hv by electrolytical polishing.

A metal C-shaped ring gasket according to the invention has an approximately crescent-shaped cross section.

A metal C-shaped gasket according to the invention is characterized in that a superficial layer thicker than 10 μm is removed by electrolytical polishing.

DESCRIPTION OF THE PREFERRED EMBODIMENTS

Figure 1:
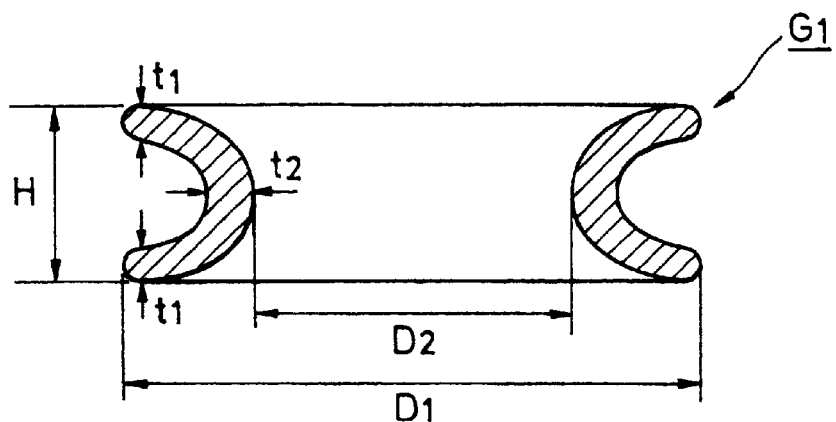
FIG. 1 is a longitudinal cross-sectional view of a metal C-shaped ring gasket indicating an embodiment of the present invention.
Figure 2:
FIGS. 2(a) to 2(e) are cross-sectional views showing fabrication steps of the metal C-shaped ring gasket of the embodiment of the present invention.
Figure 2:
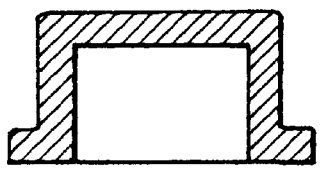
Figure 2:
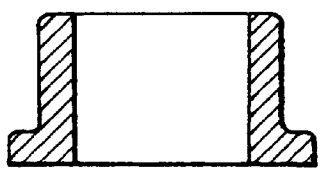
Figure 2:
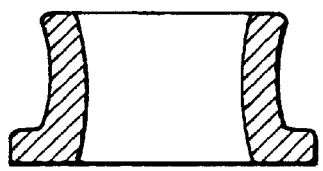
Figure 2:
Figure 3:
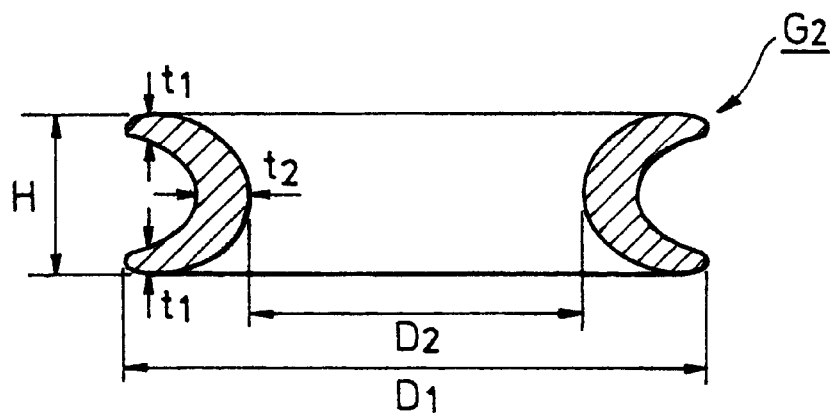
FIG. 3 is a longitudinal cross-sectional view of a metal C-shaped ring gasket having an approximately crescent-shaped cross section, which is thin in portions brought into contact with counter surfaces and thick in a middle portion.
Figure 4:
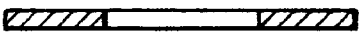
FIGS. 4(a) to 4(e) are cross-sectional views showing fabrication steps of the metal C-shaped ring gasket having an approximately crescent-shaped cross section.
Figure 4:
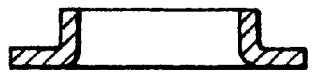
Figure 4:
Figure 4:
Figure 4:
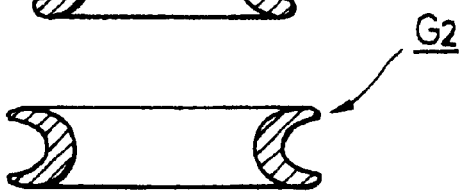

As a preferred mode of realization of the present invention, a metal C-shaped ring gasket having a superficial roughness of 0.17 μm Ra and a superficial hardness of 230 Hv was formed by a method described below. A metal C-shaped ring gasket $G_1$ indicated in FIG. 1 is fabricated by subjecting a metal plate made of SUS316L to press processing by means of a plurality of die after a dishing processing, as indicated in FIGS. 2(a) to 2(e). It is ground by Barrel grinding after having annealed it in a hydrogen atmosphere. Then it is subjected to electrolytical polishing under a condition that a superficial layer 10 μm thick is removed from the gasket.

Hereinbelow several embodiments and examples for comparison will be concretely explained. However the present invention is not restricted to these embodiments.

Embodiment 1

A metal C-shaped ring gasket having an outer diameter $D_1$ of 7.8 mm, an inner diameter $D_2$ of 5.2 mm and a height of 1.8 mm indicated in FIG. 1 is fabricated by subjecting a metal plate made of SUS316L 0.50 mm thick to press processing by means of a plurality of die after a dishing processing, as indicated in FIGS. 2(a) to 2(e). It is ground by Barrel grinding after having annealed it in an electric furnace of hydrogen atmosphere at a sustained temperature of 1100° C. during a period of time of 12 min. Then it is subjected to electrolytical polishing under a condition that a superficial layer 10 μm thick is removed from the gasket. This gasket finally obtained has a superficial roughness of 1.7 μm Ra and a superficial hardness of 230 Hv.

Embodiment 2

A metal C-shaped ring gasket fabricated by the same method as in EMBODIMENT 1 is ground by Barrel grinding after having annealed it in an electric furnace of hydrogen atmosphere at a sustained temperature of 1100° C. during a period of time of 12 min. Then it is subjected to electrolytical polishing under a condition that a superficial layer 50 μm thick is removed from the gasket. This gasket finally obtained has a superficial roughness of 0.08 μm Ra and a superficial hardness of 200 Hv.

Embodiment 3

A metal plate made of SUS316L 0.5 mm thick is punched in a doughnut shape. It is deformed in plurality of steps by press processing by means of die, as indicated in FIGS. 4(a) to 4(e). In this way a metal C-shaped ring gasket $G_2$ having an approximately crescent-shaped cross section is obtained. It has an outer diameter of 7.8 mm, an inner diameter $D_2$ of 5.2 mm, a thickness $t_2$ of 0.54 mm at the middle portion, and a thickness $t_1$ of 0.45 mm at portions, which are brought into contact with counter surfaces.

The metal C-shaped ring gasket thus obtained is ground by Barrel grinding after having annealed it in an electric furnace of hydrogen atmosphere at a sustained temperature of 1100° C. during a period of time of 12 min. Then it is subjected to electrolytical polishing under a condition that a superficial layer 10 μm thick is removed from the gasket. This gasket finally obtained has a superficial roughness of 0.10 μm and a superficial hardness of 220 Hv.

EXAMPLE FOR COMPARISON 1

A metal C-shaped ring gasket fabricated by the same method as in EMBODIMENT 1 is ground by Barrel grinding after having annealed it in an electric furnace of hydrogen atmosphere at a sustained temperature of 1100° C. during a period of time of 12 min. The metal C-shaped ring gasket thus obtained has a superficial roughness of 0.23 μm Ra and a superficial hardness of 300 Hv.

EXAMPLE FOR COMPARISON 2

A metal C-shaped ring gasket fabricated by the same method as in EMBODIMENT 1 is ground by Barrel grinding after having annealed it in an electric furnace of hydrogen atmosphere at a sustained temperature of 1100° C. during a period of time of 12 min and then it is polished chemically by using an acid solution. The metal C-shaped ring gasket thus obtained has a superficial roughness of 0.19 μm Ra and a superficial hardness of 270 Hv.

EXAMPLE FOR COMPARISON 3

A metal C-shaped ring gasket $G_2$ is fabricated by the same method as in EMBODIMENT 3. It is subjected thereafter neither to annealing nor to Barrel grinding nor to electrolytic polishing.

In order to compare the metal C-shaped ring gaskets obtained in the embodiments and the examples for comparison with each other, each of the gaskets was mounted and clamped between flanges. They were covered by a hood, which was filled with helium gas, and helium gas leaked into the interior of the flanges was measured by means of a helium leak detector. Seal test results are indicated in TABLE 1.

TABLE 1

| | AMOUNT OF LEAK (Pa · m³/sec He) |
|---|---|
| EMBODIMENT 1 | $1.6 \times 10^{-10}$ |
| EMBODIMENT 2 | below $1.0 \times 10^{-11}$ (below detection sensitivity) |
| EMBODIMENT 3 | below $1.0 \times 10^{-11}$ (below detection sensitivity) |
| EXAMPLE FOR COMPARISON 1 | $4.8 \times 10^{-9}$ |
| EXAMPLE FOR COMPARISON 2 | $1.0 \times 10^{-9}$ |
| EXAMPLE FOR COMPARISON 3 | $1.6 \times 10^{-10}$ |

As clearly seen from TABLE 1, it can be verified that the amount of leak in EMBODIMENT 1 is smaller than ⅒ of that obtained in EXAMPLE FOR COMPARISON 1 and that the amount of leak in EMBODIMENT 2, where the amount removed by electrolytic polishing is increased, is further smaller than that obtained in EMBODIMENT 1. Further the amount of leak in EXAMPLE FOR COMPARISON 2, where the gasket was subjected to chemical polishing used for improving cleanliness of the surface, was greater than those obtained in the embodiments. It can be thought that the hardened layer is not removed satisfactorily, because the superficial layer is removed only by several pm.

It is a matter of course that the surface treatment by electrolytic polishing used in the embodiments can be applied not only to metal C-shaped ring gaskets but also to metal hollow O-rings and other metal gaskets used in semiconductor fabrication devices, etc.

As described above in detail, by using metal C-shaped ring gaskets according to the present invention also in ultra-high vacuum apparatuses such as semiconductor fabrication devices, etc., it is possible to obtain an effect that there is no leak of fluid and a good sealing property can be maintained.

What is claimed is:

1. A crescent-shaped metal ring gasket comprising an austenite stainless steel and having an inner surface and an outer surface, an outward projecting cross-section of said gasket defining the crescent-shape, a central plane on the inner surface of the ring gasket dividing said gasket into symmetric portions, a central axis perpendicular to the central plane and equidistant from the inner surface of said gasket, the ring gasket having a first smallest diameter relative to the central axis at the central plane, outwardly spaced edges on the inner surface of said gasket extending about the circumference of the gasket having a second diameter relative to said central axis greater than the first diameter, the thickness of said gasket between the inner and outer surfaces thereof being maximum at the central plane and decreasing at positions outwardly therefrom and finishing at the spaced edges of the crescent-shaped gasket, and said ring gasket having a superficial roughness below 0.2 $\mu$m Ra and a superficial hardness below 230 Hv.

2. The metal ring gasket according to claim 1, wherein said ring gasket comprises a monolithic element.

3. The metal ring gasket according to claim 1, wherein said ring gasket is free from coil springs.

* * * * *